United States Patent
Gasior et al.

(10) Patent No.: US 10,650,210 B1
(45) Date of Patent: May 12, 2020

(54) METHOD FOR AUTHENTICATING A FILTER CARTRIDGE FOR A REFRIGERATOR APPLIANCE

(71) Applicant: Haier US Appliance Solutions, Inc., Wilmington, DE (US)

(72) Inventors: Bradford Gasior, Louisville, KY (US); Gregory Sergeevich Chernov, Louisville, KY (US); Jose Rafael Padron, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/355,915

(22) Filed: Mar. 18, 2019

(51) Int. Cl.
*G06K 5/04* (2006.01)
*G06K 7/14* (2006.01)
*B01D 27/00* (2006.01)
*G06Q 30/00* (2012.01)

(52) U.S. Cl.
CPC ........... *G06K 7/1447* (2013.01); *B01D 27/00* (2013.01); *G06K 7/143* (2013.01); *G06K 7/1478* (2013.01); *G06Q 30/018* (2013.01)

(58) Field of Classification Search
CPC ..... G06K 7/14; G06K 7/10851; G06K 7/1443
USPC .................................... 235/462.08
See application file for complete search history.

(56) References Cited

U.S. PATENT DOCUMENTS

| 4,685,141 A | 8/1987 | Hoque et al. |
| 4,958,064 A | 9/1990 | Kirkpatrick |
| 5,300,764 A | 4/1994 | Hoshino et al. |
| 5,666,434 A | 9/1997 | Nishikawa et al. |
| 5,726,435 A | 3/1998 | Hara et al. |
| 6,192,160 B1 | 2/2001 | Sunwoo et al. |
| 6,195,659 B1 | 2/2001 | Hyatt |
| 6,336,587 B1 | 1/2002 | He et al. |
| 6,728,391 B1 | 4/2004 | Wu et al. |
| 8,090,018 B2 | 1/2012 | Hsieh et al. |
| 8,935,938 B2 | 1/2015 | Krause et al. |
| 10,027,866 B2 * | 7/2018 | Carlotto .................. G06F 16/51 |
| 10,406,461 B2 * | 9/2019 | Bippus .................. F25D 23/126 |
| 2008/0060982 A1 * | 3/2008 | Krause .................. F25D 23/126 210/85 |
| 2010/0106265 A1 * | 4/2010 | Ebrom .................... H04L 69/26 700/90 |
| 2016/0210545 A1 * | 7/2016 | Anderton ............. G06K 7/1443 |
| 2018/0243372 A1 | 8/2018 | Von Knethen et al. |

FOREIGN PATENT DOCUMENTS

CN 101615259 12/2009

* cited by examiner

*Primary Examiner* — Ahshik Kim
(74) *Attorney, Agent, or Firm* — Dority & Manning, P. A.

(57) ABSTRACT

A filter assembly for authenticating a filter cartridge includes a filter housing and an optical scanner mounted to the filter housing. A controller uses the optical scanner to take one or more digital images of the filter cartridge and obtain digital coded data identifying the filter cartridge. Specifically, the controller locates a functional locator on the filter cartridge, determines a location of an identifying region on the filter cartridge, reads the digital coded data by interrogating the identifying region with the optical scanner, and determines that the filter cartridge is authentic based at least in part on the digital coded data.

18 Claims, 9 Drawing Sheets

METHOD FOR AUTHENTICATING A FILTER CARTRIDGE FOR A REFRIGERATOR APPLIANCE

FIELD OF THE INVENTION

The present subject matter relates generally to filter assemblies for refrigerator appliances, and more particularly to filter assemblies that may be used to authenticate filter cartridges.

BACKGROUND OF THE INVENTION

Refrigerator appliances generally include a cabinet that defines a chilled chamber for receipt of food articles for storage. In addition, refrigerator appliances commonly include dispensing assemblies for providing water and/or ice to the user, and water filter assemblies are frequently used to filter such water before use. For example, certain water filter assemblies include a manifold and a filter cartridge. The manifold directs unfiltered water into the filter cartridge and filtered water out of the filter cartridge. The filter cartridge includes a filter medium, such as an activated carbon block, a pleated polymer sheet, a spun cord material, or a melt blown material. The filter medium is positioned within the filter cartridge and filters water passing therethrough.

Over time, the filter medium will lose effectiveness. For example, pores of the filter medium can become clogged or the filter medium can become saturated with contaminants. To ensure that the filtering medium has not exceeded its filtering capacity, the filtering medium is preferably replaced or serviced at regular intervals regardless of its current performance. To permit replacement or servicing of the filter medium or the filter cartridge, the filter cartridge is generally removably mounted to the manifold.

Appliance manufacturers have an interest in ensuring that replacement filter cartridges are manufactured according to standards set and controlled by the manufacturer. For example, by authenticating filter cartridges prior to use, the appliance manufacturer can ensure the appliance performs to desired standards and can control the quality associated with their products. In addition to improved appliance performance, requiring the use of authentic replacement filter cartridges may provide a significant revenue stream to the manufacturer.

Accordingly, a refrigerator appliance with an improved filter assembly would be useful. More specifically, a filter assembly that may authenticate filter cartridges would be particularly beneficial.

BRIEF DESCRIPTION OF THE INVENTION

Aspects and advantages of the invention will be set forth in part in the following description, or may be apparent from the description, or may be learned through practice of the invention.

In a first exemplary embodiment, a method of using a filter assembly to authenticate a filter cartridge is provided including locating a functional locator on the filter cartridge using an optical scanner, determining a location of an identifying region on the filter cartridge, the identifying region containing digital coded data, reading the digital coded data by interrogating the identifying region with the optical scanner, and determining that the filter cartridge is authentic based at least in part on the digital coded data.

According to another exemplary embodiment, a filter assembly for authenticating a filter cartridge is provided. The filter assembly including a filter housing configured for receiving the filter cartridge, an optical scanner for obtaining one or more digital images of the filter cartridge, and a controller in operative communication with the optical scanner. The controller is configured for locating a functional locator on the filter cartridge using the optical scanner, interrogating an identifying region with the optical scanner, the identifying region containing digital coded data, and determining that the filter cartridge is authentic based at least in part on the digital coded data read within the identifying region.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
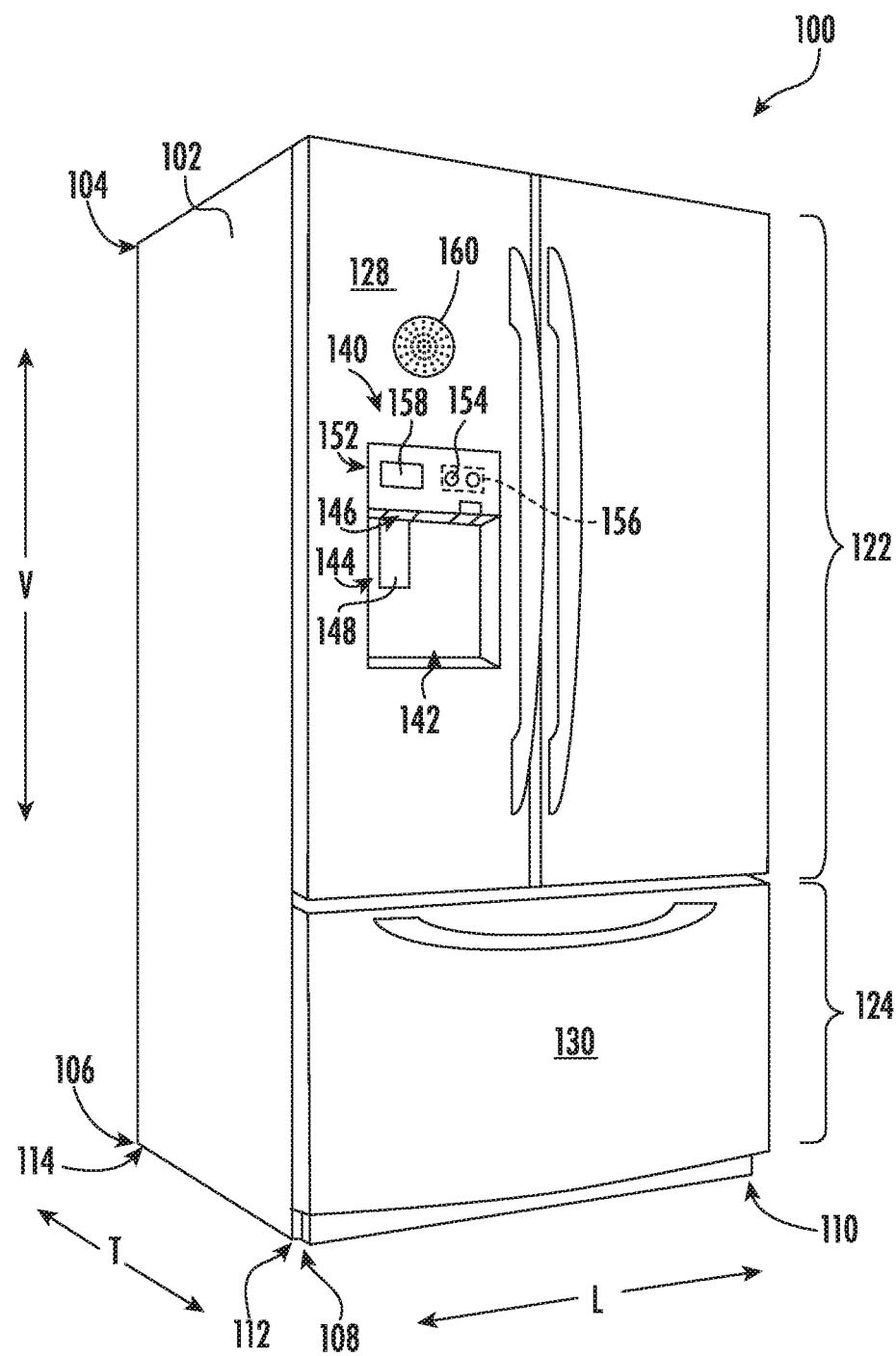
FIG. 1 provides a perspective view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a refrigerator appliance 100 according to an exemplary embodiment of the present subject matter. Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another, such that an orthogonal coordinate system is generally defined.

Housing 102 defines chilled chambers for receipt of food items for storage. In particular, housing 102 defines fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Moreover, aspects of the present subject matter may be applied to other fluid supply systems or water-consuming appliances as well, such as ice makers, coffee makers, water coolers, etc. Consequently, the description set forth herein is for illustrative purposes only and is not intended to be limiting in any aspect to any particular appliance or configuration.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1. One skilled in the art will appreciate that other chamber and door configurations are possible and within the scope of the present invention.

Figure 2:
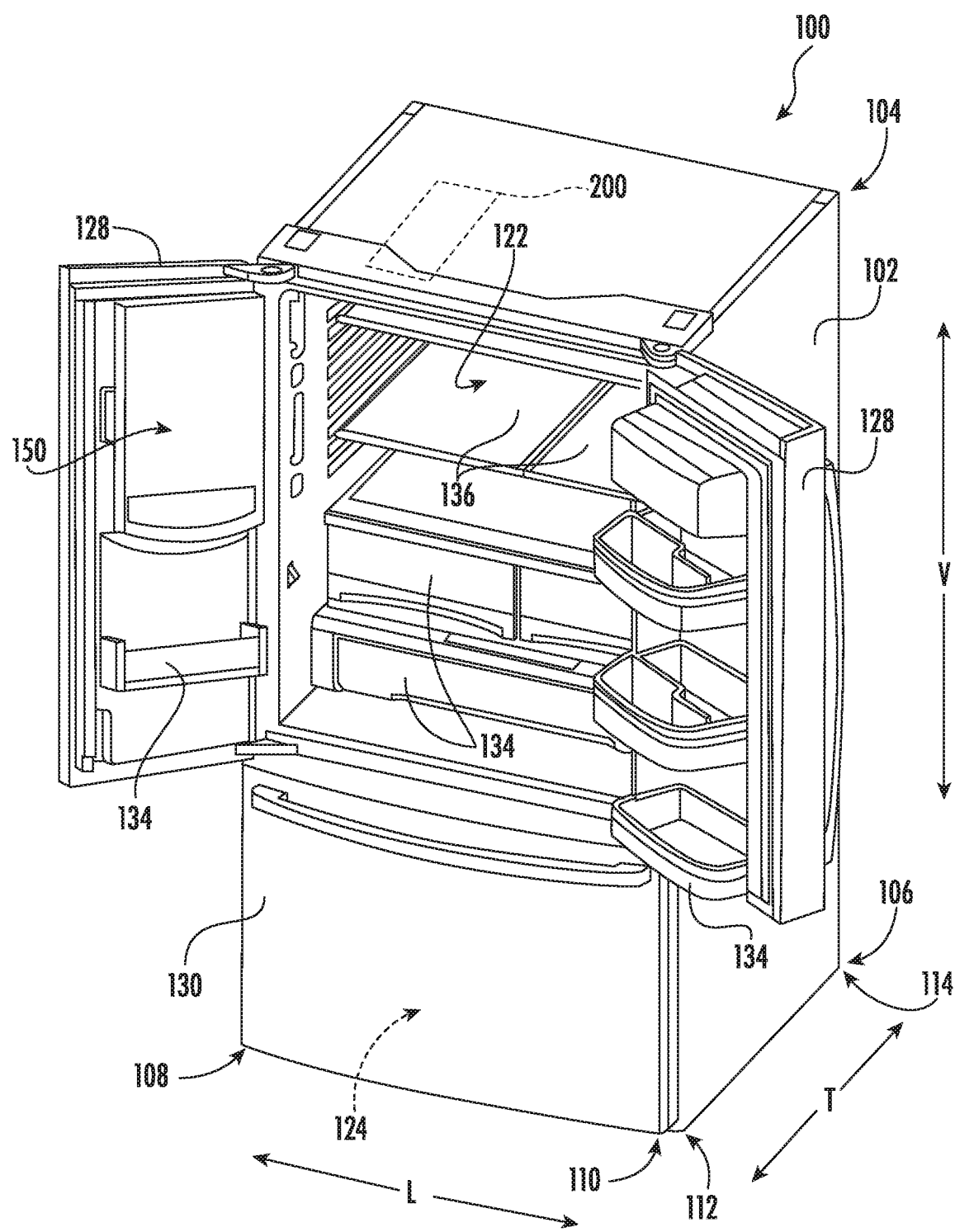
FIG. 2 provides a perspective view of the exemplary refrigerator appliance of FIG. 1, with the doors of the fresh food chamber shown in an open position.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Referring again to FIG. 1, a dispensing assembly 140 will be described according to exemplary embodiments of the present subject matter. Although several different exemplary embodiments of dispensing assembly 140 will be illustrated and described, similar reference numerals may be used to refer to similar components and features. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142. By contrast, refrigerator door 128 may define an icebox compartment 150 (FIG. 2) housing an icemaker and an ice storage bin (not shown) that are configured to supply ice to dispenser recess 142.

A control panel 152 is provided for controlling the mode of operation. For example, control panel 152 includes one or more selector inputs 154, such as knobs, buttons, touchscreen interfaces, etc., such as a water dispensing button and an ice-dispensing button, for selecting a desired mode of operation such as crushed or non-crushed ice. In addition, inputs 154 may be used to specify a fill volume or method of operating dispensing assembly 140. In this regard, inputs 154 may be in communication with a processing device or controller 156. Signals generated in controller 156 operate refrigerator appliance 100 and dispensing assembly 140 in response to selector inputs 154.

As used herein, "processing device" or "controller" may refer to one or more microprocessors or semiconductor devices and is not restricted necessarily to a single element. The processing device can be programmed to operate refrigerator appliance 100, dispensing assembly 140, and other components of refrigerator appliance 100. The processing device may include, or be associated with, one or more memory elements (e.g., non-transitory storage media). In some such embodiments, the memory elements include electrically erasable, programmable read only memory (EE-PROM). Generally, the memory elements can store information accessible processing device, including instructions that can be executed by processing device. Optionally, the instructions can be software or any set of instructions and/or data that when executed by the processing device, cause the processing device to perform operations.

As may be seen in FIG. 1, refrigerator appliance 100 also includes a display 158. According to the illustrated embodiment, display 158 may be provided on control panel 152 and may be any suitable device or mechanism for providing visual feedback to a user of refrigerator appliance 100. As an example, display 158 may be an indicator light such as a light emitting diode or bulb that flashes or otherwise emits light when a certain event occurs. As another example, display 158 may be a liquid crystal display, plasma screen, or a touchscreen display that displays messages or information thereon and provides for interactive user input. Display 158 may be in communication with controller 156, and may display information in response to signals from controller 156. For example, as will be described below, display 158 may provide a notification to a user of refrigerator appliance 100 that a water filter is or is not detected, that a filter cartridge is properly or improperly positioned, that a filter cartridge needs to be replaced, or that other service or performance issues related to the operation of refrigerator appliance 100 need to be addressed.

According to the illustrated embodiment, refrigerator appliance 100 further includes a sound generator 160. Sound generator 160 is configured for generating an audible indicator in response to a condition or event related to refrigerator appliance 100. Sound generator 160 can be any suitable mechanism for providing audible feedback to a user of refrigerator appliance 100, e.g., such as a speaker that emits sound, a beeper, etc. Similar to display 158, controller 156 is in communication with sound generator 160 and can selectively activate sound generator 160 in order to notify a user of refrigerator appliance 100 of operating conditions similar to those described above.

Display 158 and sound generator 160 may be positioned at any suitable locations on refrigerator appliance 100. For example, display 158 and sound generator 160 can be mounted to housing 102 of refrigerator appliance 100, e.g., at control panel 152 of refrigerator appliance 100 above dispenser recess 142. It should be understood that refrigerator appliance 100 need not include both display 158 and sound generator 160 and may include only display 158 or sound generator 160.

Figure 3:
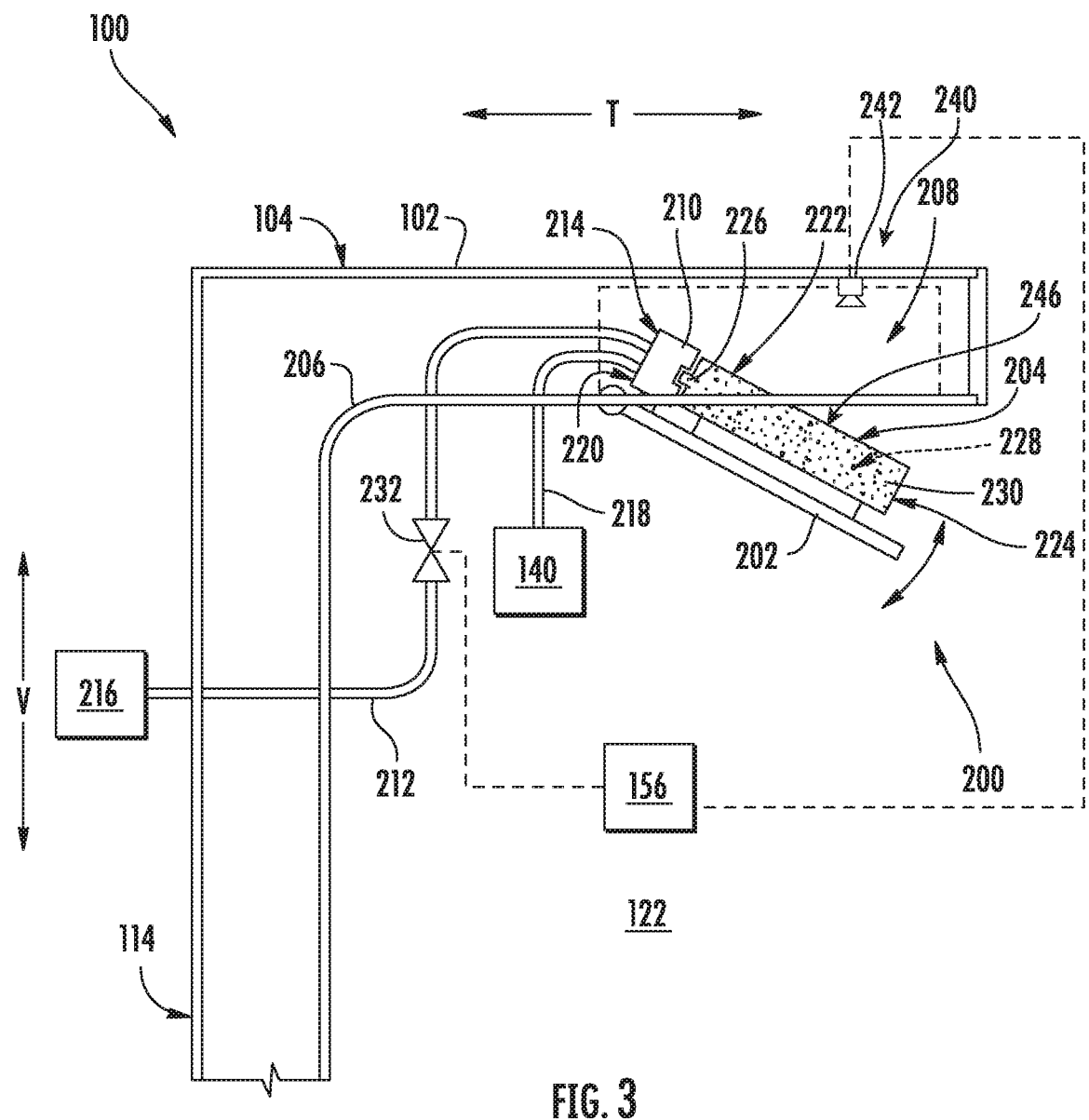
FIG. 3 provides a schematic side view of a filter assembly for use with the exemplary refrigerator appliance of FIG. 1 according to an exemplary embodiment of the present subject matter.

Referring now generally to FIGS. 2 and 3, a filter assembly 200 which may be used with refrigerator appliance 100 will be described according to exemplary embodiments of the present subject matter. Specifically, FIG. 2 illustrates an exemplary location of filter assembly 200 within cabinet 102 and FIG. 3 provides a side, schematic view of filter assembly 200. It should be appreciated that filter assembly 200 is illustrated and described herein as being positioned for use in refrigerator appliance 100. However, it should be appreciated that aspects of the present subject matter are not limited to the embodiments described or to the particular application disclosed.

As discussed in greater detail below, filter assembly 200 is generally configured for filtering water passing therethrough. In such a manner, filter assembly 200 can provide filtered water to various components of refrigerator appliance 100, such as dispensing assembly 140. Specifically, filter assembly 200 may generally include a filter housing 202 that is mounted within cabinet 102 and is generally configured for receiving a filter cartridge 204. For example, as illustrated in FIG. 3, filter housing 202 may be pivotally mounted to a top wall of an insulated liner 206 which defines fresh food chamber 122. In addition, refrigerator appliance 100 may define a void or filter recess 208 between insulated liner 206 and top 104 of cabinet 102 for receiving filter housing 202 and filter cartridge 204 when pivoted into the closed position. In this regard, filter housing 202 may be pivoted between an open position (e.g., as shown in FIG. 3) for permitting a user to access or install filter cartridge 204 and a closed position (not shown) when filter assembly 200 is in use.

According to the illustrated embodiment, filter assembly 200 is positioned proximate top 104 of cabinet 102, e.g., within filter recess 208 in the insulated space between insulated liner 206 and cabinet 102. However, it should be appreciated that filter housing 202 can be mounted to any suitable portion of refrigerator appliance 100 in order to receive filter cartridge 204 for filtering water within refrigerator appliance 100. For example, filter housing 202 may be mounted to refrigerator door 128, proximate bottom 106 of cabinet 102, or on an outside of cabinet 102. In addition, although filter housing 202 is illustrated as being pivotally mounted for installing or removing filter cartridges 204, it should be appreciated that access could alternatively be obtained through an access door or in any other suitable manner.

As may be seen in FIG. 3, filter assembly 200 includes a filter manifold 210 which is mounted to filter housing 202, e.g., at or proximate a rear of filter housing 202 along the transverse direction T. Filter manifold 210 is configured for receiving unfiltered water and directing filtered water out of filter assembly 200. In particular, filter manifold 210 includes an inlet conduit 212 that defines an inlet 214 for receiving unfiltered water, e.g., from a water source 216 such as a municipal water supply or a well. Filter manifold 210 also includes an outlet conduit 218 that defines an outlet 220. Outlet 220 directs filtered water out of filter assembly 200. Thus, filter manifold 210 receives unfiltered water at inlet 214. Such unfiltered water passes through filter assembly 200 (and filter cartridge 204) and exits filter manifold 210 at outlet 220 as filtered water.

As illustrated and described herein, filter cartridge 204 is configured for filtering unfiltered water received at inlet 214 of filter manifold 210. Thus, filter cartridge 204 filters water passing through filter assembly 200. Filter cartridge 204 extends between a first end 222 and a second end 224, e.g., along the transverse direction T (e.g., when installed). A connection 226 of filter cartridge 204 is positioned at or proximate first end 222 of filter cartridge 204. Connection 226 of filter cartridge 204 is configured for engaging filter manifold 210, e.g., in order to removably mount filter cartridge 204 to filter manifold 210.

Connection 226 of filter cartridge 204 also places filter cartridge 204 in fluid communication with filter manifold 210 when filter cartridge 204 is mounted to filter manifold 210. Thus, filter cartridge 204 can receive unfiltered water from inlet 214 of filter manifold 210 at connection 226 and direct such unfiltered water into a chamber 228 when filter cartridge 204 is mounted to filter manifold 210. Water within chamber 228 can pass through a filtering media 230 positioned within chamber 228 and can exit chamber 228 as filtered water. In particular, connection 226 of filter cartridge 204 can direct filtered water out of chamber 228 to outlet 220 of filter manifold 210 when filter cartridge 204 is mounted to filter manifold 210. In such a manner, filtering media 230 of filter cartridge 204 can filter a flow of water through filter assembly 200, e.g., thereby improving the taste and/or safety of the water.

Filtering media 230 can include any suitable mechanism for filtering water within filter assembly 200. For example, filtering media 230 may include an activated carbon block, a reverse osmosis membrane, a pleated polymer or cellulose sheet, or a melt blown or spun cord media. In this manner, filtering media 230 can remove contaminants such as chlorine, chloroform, lead, arsenic, pharmaceuticals, microbes, and/or other undesirable substances from water supplied to refrigerator appliance 100. As used herein, the term "unfiltered" describes water that is not filtered relative to filtering media 230. However, as will be understood by those skilled in the art, filter assembly 200 may include additional filters that filter water entering chamber 228. Thus, "unfiltered" may be filtered relative to other filters but not filtering media 230. As will be understood and used herein, the term "water" includes purified water and solutions or mixtures containing water and, e.g., elements (such as calcium, chlorine, and fluorine), salts, bacteria, nitrates, organics, and other chemical compounds or substances.

According to exemplary embodiments, filter assembly 200 and its components may be formed from any material which is sufficiently rigid to support filter cartridge 204 and/or other assembly components. For example, filter housing 202 may be formed by injection molding, e.g., using a suitable plastic material, such as injection molding grade high impact polystyrene (HIPS) or acrylonitrile butadiene styrene (ABS). Alternatively, according to the exemplary embodiment, these components may be compression molded, e.g., using sheet molding compound (SMC) thermoset plastic.

Refrigerator appliance 100 also includes a control valve 232 as schematically shown in FIG. 3. Control valve 232 may be any valve suitable for regulating a flow of water to filter assembly 200, such as a solenoid valve. In this regard, control valve 232 is operably coupled to inlet conduit 212 and selectively shifts between a closed position and an open position. In the open position, control valve 232 permits the flow of water to filter assembly 200 for filtering before supplying it for end use, e.g., via dispensing assembly 140. Conversely, control valve 232 obstructs or blocks the flow of water to filter assembly 200 in the closed position such that water for filtering is not supplied to filter assembly 200 or is supplied to filter assembly 200 in an insubstantial volume. In such a manner, control valve 232 can regulate the flow of water to filter assembly 200 by shifting between the open and closed positions. Control valve 232 may be in communication with controller 156, and may operate in response to signals from controller 156. For example, as will be described below, controller 156 may close control valve 232 if filter cartridge 204 is not determined to be authentic, if filter cartridge 204 is not properly positioned/installed, if a filter cartridge needs to be replaced, or in the event of other service or performance issues related to the operation of refrigerator appliance 100.

As will be understood by those skilled in the art, filtering media 230 of filter cartridge 204 can lose efficacy over time. Thus, a user can replace filtering cartridge 204 and/or filtering media 230 of filter cartridge 204 at regular intervals, after a certain volume of water has passed through filter cartridge 204, after a certain contamination level has been reached, or when a filtering capacity drops below a threshold level. To replace filter cartridge 204 and/or filtering media 230 of filter cartridge 204, the user can remove or disconnect filter cartridge 204 from filter manifold 210 and insert or mount a new filter cartridge 204 or filtering media 230 of filter cartridge 204. Alternatively, filter cartridge 204 may be serviced or filtering media 230 may be changed or refreshed in order to ensure continuous, effective filtering of water flowing through filter assembly 200. However, it may be desirable to authenticate replacement of filter cartridges, e.g., to ensure consistent filtering performance, to capitalize on the revenue stream generated by replacement cartridges, to maintain quality standards, or to otherwise ensure a desirable performance of filter assembly 200. Thus, as discussed in greater detail below, refrigerator appliance 100 and filter assembly 200 may include features and methods of operation for authenticating filter cartridges 204.

Specifically, referring still to FIG. 3, refrigerator appliance 100 and filter assembly 200 may further include a filter authentication system 240. Filter authentication system 240 is generally configured for detecting the presence of and verifying the authenticity of filter cartridges 204 installed within filter assembly 200. Although filter authentication system 240 is described herein with respect to filter assembly 200, it should be appreciated that filter authentication system 240 can be used in any other suitable appliance for identifying and/or authenticating filter cartridges. Moreover, the authentication methods used herein may be used in any application for identifying and authenticating any part of a system or machine. In addition, filter authentication system 240 may be used for obtaining other useful information from filter cartridge 204, such as functional data, qualitative and/or quantitative data related to the cartridge, such as filter usage level, filter remaining life, filter model information, filter name, and filter manufacturer. In this manner, for example, original equipment manufacturers may use such an authentication system to ensure quality replacement parts are used in their original equipment devices.

As illustrated in FIG. 3, filter authentication system 240 includes an optical scanner 242 for obtaining a digital image 244 (e.g., as shown in FIGS. 5 through 10) which may contain useful information for authenticating or otherwise using filter cartridge 204. According to the illustrated embodiment, optical scanner 242 is mounted to cabinet 102, e.g., within filter housing 202, in a fixed location for obtaining digital image 244 at a fixed location on a surface 246 of filter cartridge 204 when properly installed into filter housing 202. Although optical scanner 242 is described herein as being fixed to filter housing 202, it should be appreciated that according to alternative embodiments optical scanner 242 may be movable to any suitable location and orientation for obtaining a digital image of filter cartridge 204 or otherwise reading authentication information from filter cartridge 204.

As used herein, the term "optical scanner" and the like are intended to refer to one or more devices using light beams to scan and/or digitally convert images, codes, text, or objects as two-dimensional (2D) digital files or images. For example, optical scanner 242 may include one or more of a photodiode, an optical camera, an infrared (IR) camera, a photomultiplier tube, a spectrometer, a light dependent resistor, an optocoupler, or another optical or spectral sensor configured for measuring electromagnetic energy in any frequency spectrum(s), such as infrared (IR), ultraviolet (UV), visible light, etc. According to an exemplary embodiment, the methods described herein permit the authentication of filter cartridges using very low resolution (and thus cheaper) optical scanners. Specifically, according to one embodiment, optical scanner 242 is an infrared camera having a resolution of 60 by 60 pixels or less. According to another embodiment, optical scanner 242 may be a camera with day and night vision, could have any other suitable resolution, etc.

As best shown in FIG. 3, a controller is in operative communication with optical scanner 242 for receiving, decoding, and analyzing digital image 244 received from optical scanner 242, as described in more detail below. Specifically, according to the illustrated embodiment, the controller may be appliance controller, e.g. controller 156. However, according to alternative embodiments, filter assembly 200 may have a dedicated controller for communicating with optical scanner 242, e.g., to obtain information regarding filter authenticity or other information. Controller 156 may then make a determination as to whether filter cartridge 204 is authentic and adjust operation of filter assembly 200 and refrigerator appliance 100 accordingly. For example, controller 156 may further be in communication with control valve 232 for regulating the flow of water through filter assembly 200. Thus, if controller 156 determines that filter cartridge 204 is not authentic, controller 156 may close control valve 232 to prevent the flow of water therethrough. Alternatively, controller 156 may provide a notification to the user of refrigerator appliance 100, e.g., using display 158 and/or sound generator 160.

Now that the construction and configuration of refrigerator appliance 100, filter assembly 200, and filter authentication system 240 have been described according to exemplary embodiments of the present subject matter, an exemplary method 300 for using a filter assembly and authentication system to authentic a filter cartridge will be described according to an exemplary embodiment of the present subject matter. Method 300 can be used to operate filter assembly 200 and filter authentication system 240, or may be used to operate any other suitable filter assembly or component identification system. In this regard, for example, controller 156 may be configured for implementing some or all steps of method 300. Further, it should be appreciated that the exemplary method 300 is discussed herein only to describe exemplary aspects of the present subject matter, and is not intended to be limiting.

Figure 4:
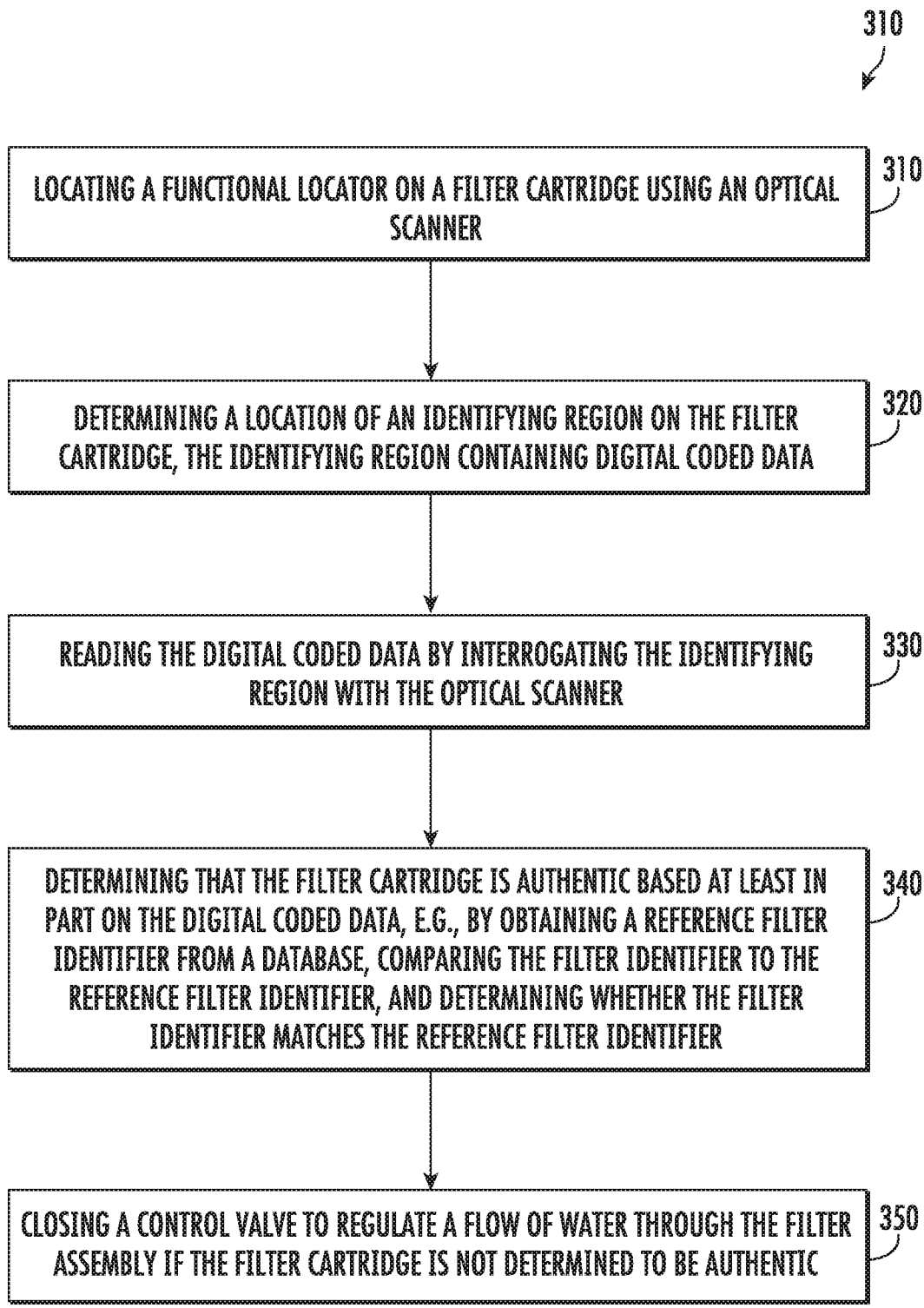
FIG. 4 provides a method of authenticating a filter cartridge according to an exemplary embodiment of the present subject matter.

Referring now to FIG. 4, method 300 includes, at step 310, locating a functional locator on a filter cartridge using an optical scanner. Specifically, continuing the example from above, a functional locator 250 may be defined or printed on surface 246 of filter cartridge 204. Optical scanner 242 may obtain a digital image 244 which may include functional locator 250 and may use digital image recognition algorithms and software to precisely locate the functional locator 250 within digital image 244 and on filter cartridge. Optical scanner 242 may take a single image or multiple images and may analyze them independently, stitch them together in a single compiled image, or analyze them in any other suitable manner.

As used herein, the term "functional locator" and the like may be used generally to refer to any feature, code, image, or other detectable indicia on surface 246 of filter cartridge 204 which may provide an indication as to the position and/or orientation of filter cartridge 204 relative to filter housing 202. For example, according to one exemplary embodiment, functional locator 250 may be a manufacturer logo or any other predefined shape or image which may be precisely located using optical scanner 242.

Notably, functional locator 250 may be printed or defined at a predetermined location relative to an identifying region 252 of filter cartridge 204. Step 320 generally includes determining a location of an identifying region on the filter cartridge. Notably, the identifying region may include a filter identifier, e.g., which according to an exemplary embodiment may be digital coded data which may be used for authentication of filter cartridge 204. In this manner, an authorized third party who knows the relative positioning of functional locator 250 and identifying region 252 may easily locate functional locator 250 and use it as a reference for locating and scanning identifying region 252 to read a filter identifier or other useful filter information. Specifically, according to the exemplary embodiment described herein, filter identifier is located within identifying region 252 and generally includes digital coded data 254, which may include, for example, binary coded data. However, it should be appreciated that according to alternative embodiments, filter identifier take any other form, may be read in any other suitable manner, and may communicate information using any other suitable method.

Figure 5:
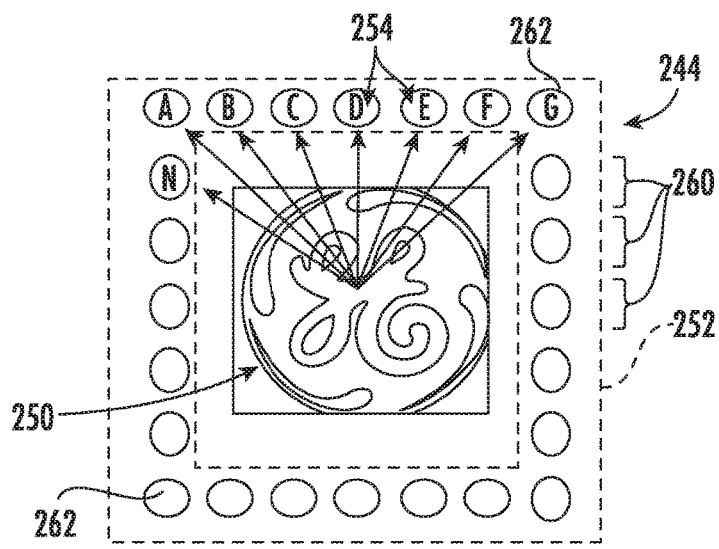
FIG. 5 illustrates an image taken by an optical scanner which may be used with the exemplary filter assembly of FIG. 3 to authentic a filter cartridge according to an exemplary embodiment of the present subject matter.
Figure 6:
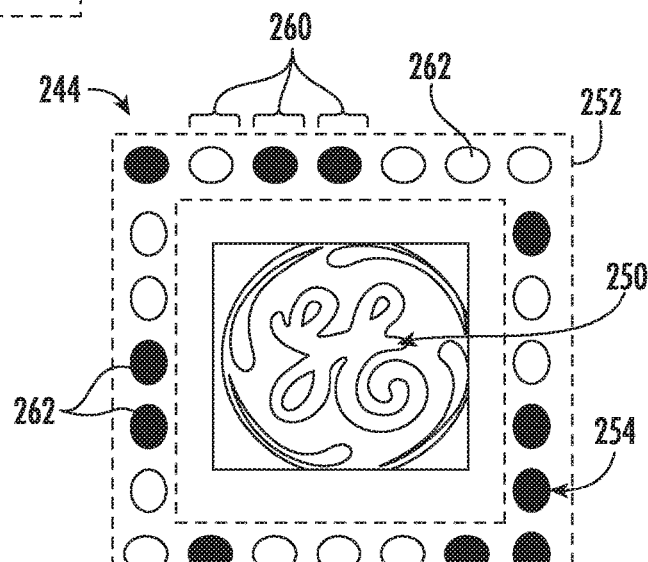
FIG. 6 illustrates an image taken by an optical scanner which may be used with the exemplary filter assembly of FIG. 3 to authentic a filter cartridge according to another exemplary embodiment of the present subject matter.
Figure 7:
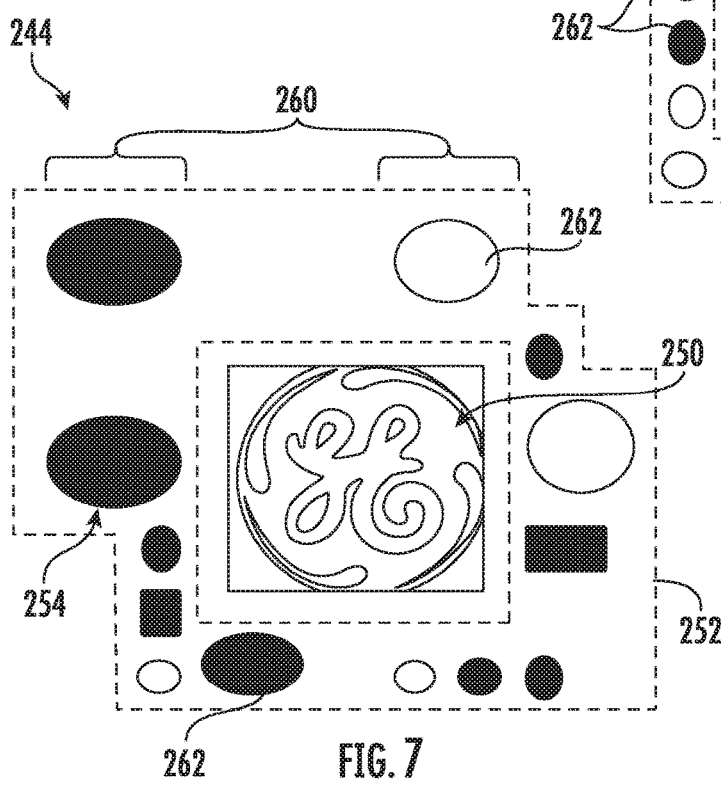
FIG. 7 illustrates an image taken by an optical scanner which may be used with the exemplary filter assembly of FIG. 3 to authentic a filter cartridge according to another exemplary embodiment of the present subject matter.

Referring now briefly to FIGS. 5 through 7, identifying region 252 may be positioned on filter cartridge 204 at any suitable position relative to functional locator 250 and/or at any suitable angle relative to functional locator 250. For example, as illustrated, identifying region 252 may extend around and encircle or enclose functional locator 250 on surface 246 of filter cartridge 204. In this manner, according to an exemplary embodiment, optical scanner 242 may take a single digital image 244 of a portion of filter cartridge 204 which includes both identifying region 252 and functional locator 250. Controller 156 may then be used to perform an image recognition process to identify the position and orientation of functional locator 250, to read digital coded data 254, etc.

Although identifying region 252 is described herein as being positioned around functional locator 250, it should be appreciated that according to alternative embodiments, identifying region 252 may be positioned at any other suitable location and angle relative to functional locator 250. Thus, for example, functional locator may be positioned proximate first end 222 of filter cartridge 204, while identifying region 252 may be positioned proximate a second end 224 of filter cartridge 204 and at a specific angle relative to functional locator 250, e.g., at 90 degrees around a side of filter cartridge 204. In addition, it should be appreciated identifying region 252 need not be grouped in a single location, but could be spaced apart all around surface 246 of filter cartridge 204.

Step 330 includes reading the digital coded data by interrogating identifying region with the optical scanner. In this regard, the process of interrogating identifying region 252 may include obtaining digital image 244 from optical scanner 242, and performing image recognition processes to detect and recognize digital coded data 254 within identifying region 252. Specifically, according to an exemplary embodiment, identifying region 252 may include a plurality of digit locations 260. Digit locations 260 may be sub-regions within identifying region 252, each of which contains a single bit or binary digit 262 of data in any suitable form. According to the illustrated embodiment, digital coded data 254 includes a plurality of binary digits, e.g., binary digits 262, each of which are positioned within one of the plurality of digit locations 260. However, it should be appreciated that according to alternative embodiments, multiple binary digits may be positioned within a single digit location 260.

Binary digit 262 may represent data or information using any suitable form or method. In this regard, according to an exemplary embodiment, binary digit 262 may be represented as a dark or shaded region (e.g., indicating a positive digit or "1") or a light or uncolored region (e.g., which represents a negative digit or "0"). Although light and dark regions are used herein to represent binary digits 262, it should be appreciated that any suitable characteristic of digit locations 260 may be used to identify information related to digital coded data 254. For example, binary digits 262 may be represented as either an "X" or an "0," as squares or circles, as colored versus uncolored regions, etc. In addition, the light and dark regions or digit locations may have varying shapes, sizes, or positions for conveying the desired information. The scope of the present subject matter is not intended to be limited to the types of digital coded data 254 described herein.

Identifying region 252 may be any suitable size and may include any suitable amount of digital coded data 254 to convey the desired information. For example, as explained briefly above, digital coded data 254 may include a filter identifier or other suitable functional information such as information related to filter usage, filter life, filter model information, filter name, and filter manufacturer. According to the illustrated embodiment of FIG. 5, digital coded data 254 includes 24 data bits or binary digits 262. However, according to alternative embodiments digital coded data 254 may include 30 binary digits 262 or any other suitable number of binary digits 262.

Step 340 includes determining that the filter cartridge is authentic based at least in part on the digital coded data. In general, the authenticity determination may vary in complexity. For example, in the simplest form, the mere presence of digital coded data 254 may indicate that filter cartridge 204 is authentic. By contrast, a more complex authenticity determination may include reading massive amounts of encoded data, implementing encryption algorithms to decode such data, comparing the decoded data to a suitable authenticity reference, etc.

According to an exemplary embodiment, step 340 may include obtaining a reference filter identifier. As used herein, "reference filter identifier" and the like is intended to refer to a filter code, key, or other indicia of authenticity which may be used to verify a newly installed filter cartridge. For example, a plurality of reference filter identifiers may be stored in a database either on controller 156 or on a remote network accessible by controller 156 or refrigerator appliance 100. For example, the manufacturer of refrigerator appliance 100 may store an external database including reference filter identifiers for all compatible replacement of filter cartridges. Alternatively, the reference filter identifiers may be stored locally or remotely as an array of reference filter identifiers.

Step 340 may further include comparing the digital coded data 254 to the reference filter identifier. In this regard, controller 156 may compare the digital coded data 254 received from the filter cartridge 204 to one or more of the reference filter identifiers from the database. Step 340 includes determining that the filter cartridge is authentic if the digital coded data 254 matches the reference filter identifier. In this regard, upon comparing the digital coded data 254 to each of the reference filter identifiers, filter cartridge 204 is identified as authentic only if it matches a reference filter identifier that is obtained or stored in the database. By contrast, controller 156 may determine that filter cartridge 204 is not authentic if no match is found.

As described above, step 340 may be generally used for authenticating a filter cartridge by querying or reading the cartridge for digital coded data, obtaining a filter identifier from that data, and authenticating that filter identifier against a previously obtained reference filter identifier corresponding to an authentic cartridge. More specifically, a filter cartridge may be validated if it contains a filter identifier that matches a reference identifier in the database. As used herein, the filter identifier "matches" the reference identifier if a positive identification or verification may be made between the data defining the identifiers. In this regard, a 100% identical match is not required, as the filter cartridge and digital coded data may degrade or wear away during normal use. In addition, variations in scanner accuracy, calibration issues, and noise may affect the reading of the digital coded data. However, there should still be a sufficient resemblance between the filter identifier and the reference identifier that a party may, with a reasonable degree of accuracy, determine that the filter cartridge bearing the filter identifier is indeed authentic.

Controller 156 may further implement action in response to the determination made at step 340. For example, step 350 includes closing a control valve for regulating a flow of water through the filter assembly if the filter cartridge is determined not to be authentic. Thus, controller 156 may close control valve 232 if a counterfeit filter is installed into filter assembly 200. According to other embodiments, controller 156 may provide an indication to the user that the filter is or is not authentic, e.g., using display 158 and/or sound generator 160. In addition, controller 156 may provide information to a user of refrigerator appliance 100 such as remaining filter life, filter model information, etc.

Although the example above refers to implementing method 300 using refrigerator appliance 100, filter assembly 200, and filter authentication system 240, it should be appreciated that method 300 may be used to authenticate filter cartridges for any suitable filter assembly or to authenticate parts of for any suitable system or machine. For example, alternative image processing techniques may be used, different filter assembly configurations may be employed, and other variations may be made while remaining within the scope of the present subject matter.

FIG. 4 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using refrigerator appliance 100, filter assembly 200, and filter authentication system 240 as an example, it should be appreciated that these methods may be applied to identifying components in any system.

Referring now generally to FIGS. 8 through 12, a method of reading the digital coded data 254 and/or locating the functional locator 250 will be described according to an exemplary embodiment. Specifically, step 330 of reading the digital coded data may include performing digital image processing of digital image 244 obtained by optical scanner 242. For example, such digital image processing may include at least one of eroding the digital image, dilating the digital image, and summing a plurality of eroded images to obtain a more accurate image from multiple images from a low-resolution optical scanner 242. The digital image processing methods will be described below with reference to functional locator 250, but it should be appreciated that such methods may also apply to digital coded data 254 or any other features obtained in one or more digital images 244.

Figure 8:
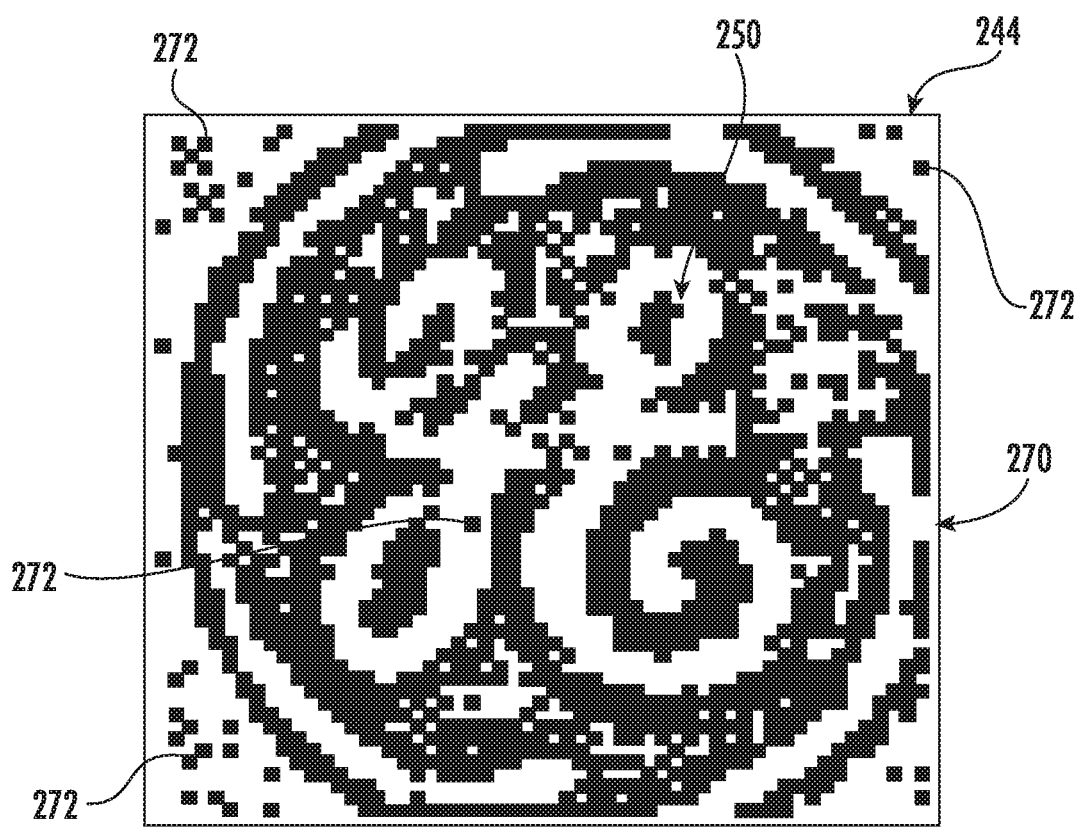
FIG. 8 provides a raw digital image taken by the exemplary optical scanner of FIG. 3 according to an exemplary embodiment of the present subject matter.
Figure 9:
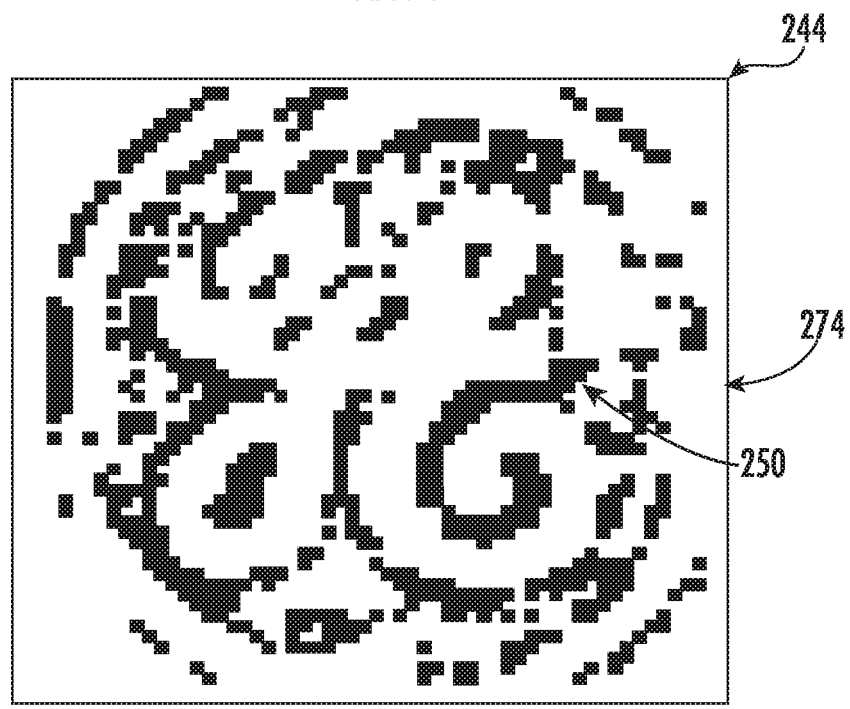
FIG. 9 illustrates the raw digital image of FIG. 8 after an erosion has been performed according to an exemplary embodiment of the present subject matter.
Figure 10:
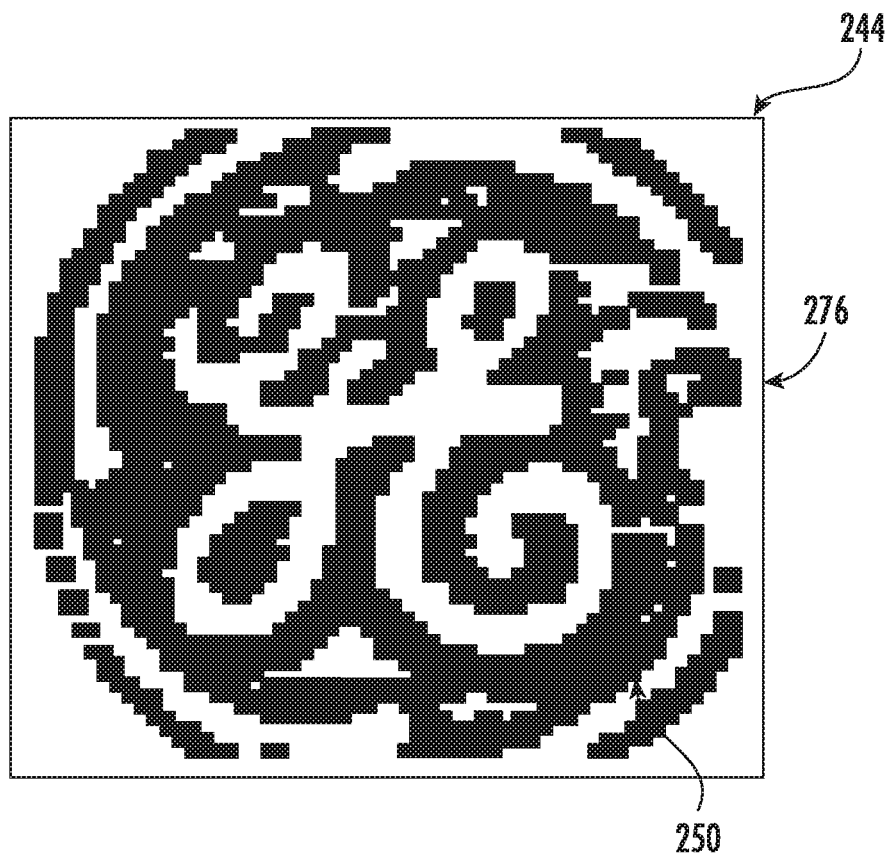
FIG. 10 illustrates a reconstructed image of the digital image taken by the exemplary optical scanner of FIG. 3 according to an exemplary embodiment of the present subject matter.

Specifically, FIG. 8 provides a raw image 270 of functional locator 250. As shown, raw image 270 includes a large number of erroneous pixels which are incorrectly shaded. Such erroneous pixels may be referred to herein as noise 272 and may result from the filter cartridge 204 degradation, image noise from optical scanner 242, etc. In order to reduce noise 272, an erosion technique may be used. In general, erosion may refer to a morphological operation on an image which removes pixels on the object boundaries to simplify the image and reduce image noise 272. An exemplary eroded image 274 is illustrated in FIG. 9. After eroding raw image 270 to form eroded image 274, a dilation procedure may be used to add pixels to the boundaries of an object of an image in order to improve the accuracy of the image. According to an exemplary embodiment, optical scanner 242 may take a plurality of raw images 270, a plurality of eroded images 274 may be obtained through the above described erosion process, and a summation may be performed of all eroded images 274 to obtain a more accurate image (such as a summation image 276 as shown in FIG. 10) of functional locator 250, digital coded data 254, or filter cartridge 204 more generally.

Figure 11:
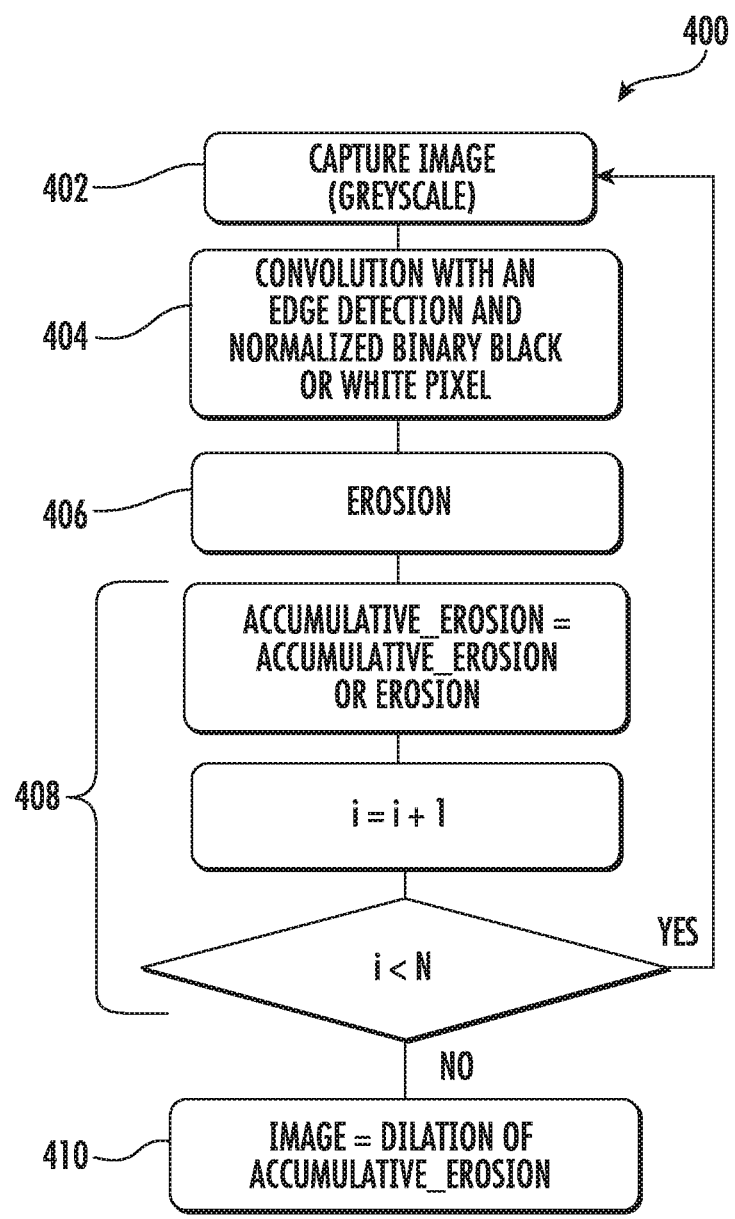
FIG. 11 provides an exemplary method of eroding and reconstructing a digital image according to an exemplary embodiment of the present subject matter.
Figure 12:
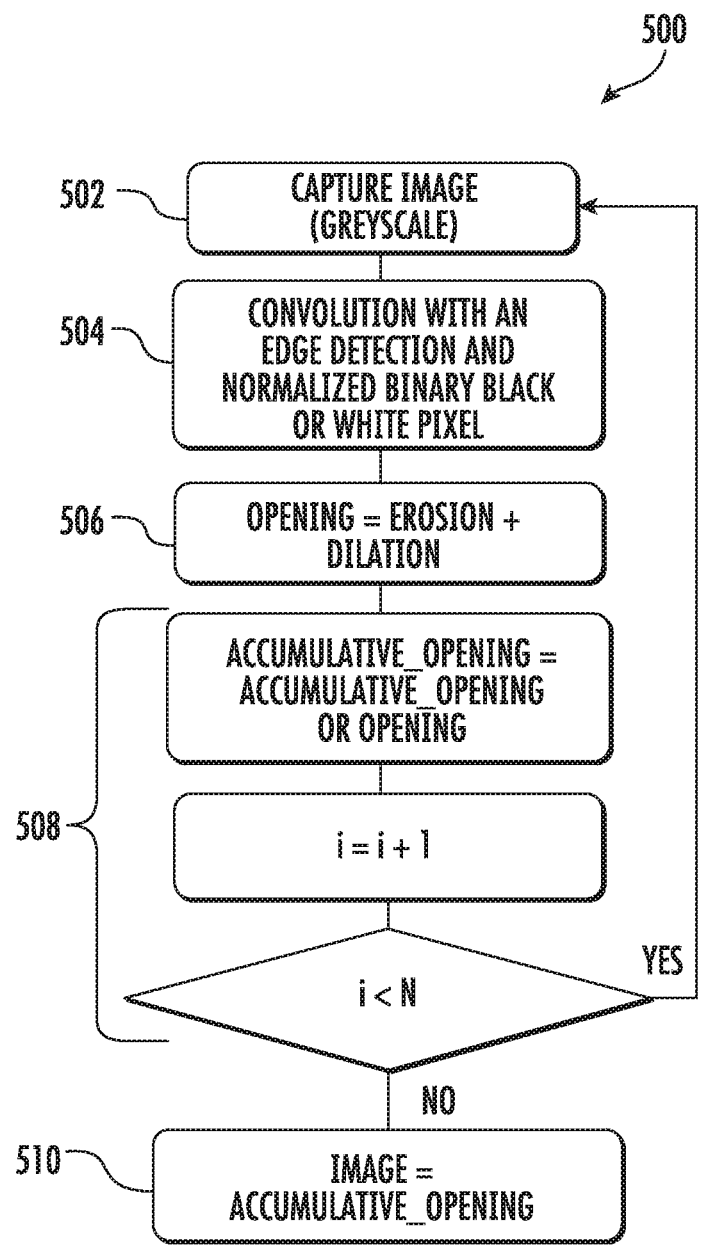
FIG. 12 provides an exemplary method of eroding and reconstructing a digital image according to another exemplary embodiment of the present subject matter.

Exemplary morphological operations are provided in FIGS. 11 and 12 according to exemplary embodiments of the present subject matter. Specifically, method 400 of FIG. 11 includes capturing an image 402, performing a convolution procedure with edge detection 404, and performing an erosion 406. Step 408 includes accumulating or summing N eroded images and step 410 includes dilating the cumulative erosion image.

FIG. 12 provides a method 500 which is similar to method 400, but which includes performing a dilation procedure on each eroded image, with the subsequent accumulation or summing of such dilated images. Specifically, step 502 includes capturing an image. Step 504 includes performing a convolution procedure with edge detection and step 506 includes eroding an image and dilating an image to reduce noise. Steps 508 include accumulating the eroded and dilated images N times. Thus, at step 510, a more refined image is provided that has the accumulation of the eroded and dilated images.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of using a filter assembly to authenticate a filter cartridge, the method comprising:
   locating a functional locator on the filter cartridge using an optical scanner;
   determining a location of an identifying region on the filter cartridge, the identifying region containing digital coded data;
   reading the digital coded data by interrogating the identifying region with the optical scanner;
   performing digital image processing of a digital image obtained by the optical scanner, wherein the digital image processing comprises at least one of eroding a digital image, dilating a digital image, eroding and dilating a digital image, and summing a plurality of eroded or dilated digital images; and
   determining that the filter cartridge is authentic based at least in part on the digital coded data.

2. The method of claim 1, wherein the digital coded data comprises a filter identifier.

3. The method of claim 2, wherein determining that the filter cartridge is authentic comprises:
   obtaining a reference filter identifier;
   comparing the filter identifier to the reference filter identifier; and
   determining that the filter cartridge is authentic if the filter identifier substantially matches the reference filter identifier.

4. The method of claim 3, wherein obtaining the reference filter identifier comprises accessing a database comprising a plurality of reference filter identifiers or an array of reference filter identifiers.

5. The method of claim 1, wherein the filter assembly comprises a filter housing for receiving the filter cartridge, and wherein the optical scanner is mounted to the filter housing.

6. The method of claim 1, wherein the optical scanner has day and night vision.

7. The method of claim 1, wherein the functional locator is positioned at a predetermined location or a predetermined angle relative to the identifying region.

8. The method of claim 1, wherein the identifying region extends around the functional locator on a surface of the filter cartridge.

9. The method of claim 1, wherein the identifying region comprises a plurality of digit locations, and wherein the digital coded data comprises a plurality of binary digits, each of the plurality of binary digits being positioned within one of the plurality of digit locations.

10. The method of claim 9, wherein each of the plurality of binary digits are represented as a dark region or a light region on a surface of the filter cartridge.

11. The method of claim 10, wherein at least two of the dark regions or the light regions have different sizes or shapes.

12. The method of claim 9, wherein the plurality of binary digits comprises greater than 10 binary digits.

13. The method of claim 1, wherein the digital coded data comprises functional data comprising at least one of filter usage, filter remaining life, filter model information, filter name, and filter manufacturer.

14. The method of claim 1, wherein the digital image processing comprises at least one of eroding a plurality of digital images, summing a plurality of eroded images, and dilating a sum of the plurality of eroded images.

15. The method of claim 1, wherein locating the functional locator and reading the digital coded data are performed using one or more digital images obtained by the optical scanner.

16. The method of claim 1, further comprising:
   closing a control valve to regulate a flow of water through the filter assembly if the filter cartridge is not determined to be authentic.

17. A filter assembly for authenticating a filter cartridge, the filter assembly comprising:
   a filter housing configured for receiving the filter cartridge;
   an optical scanner for obtaining one or more digital images of the filter cartridge; and
   a controller in operative communication with the optical scanner, the controller being configured for:
      locating a functional locator on the filter cartridge using the optical scanner;

interrogating an identifying region with the optical scanner, the identifying region containing digital coded data;

performing digital image processing of a digital image obtained by the optical scanner, wherein the digital image processing comprises at least one of eroding a digital image, dilating a digital image, eroding and dilating a digital image, and summing a plurality of eroded or dilated digital images; and determining whether the filter cartridge is authentic based at least in part on the digital coded data read within the identifying region.

18. The filter assembly of claim 17, wherein the filter assembly is mounted in a cabinet of a refrigerator appliance, and wherein the filter assembly further comprises:

a control valve for regulating a flow of water through a filter manifold, wherein the controller is further configured for closing the control valve if the filter cartridge is not determined to be authentic.

* * * * *